UNITED STATES PATENT OFFICE.

LAFAYETTE LOVE, OF HAMILTON, OHIO, ASSIGNOR OF ONE-THIRD TO FRANK E. HOFFMAN, OF SAME PLACE.

PROCESS OF TREATING LEAF-TOBACCO.

SPECIFICATION forming part of Letters Patent No. 655,791, dated August 14, 1900.

Application filed February 23, 1900. Serial No. 6,186. (No specimens.)

*To all whom it may concern:*

Be it known that I, LAFAYETTE LOVE, a citizen of the United States, residing at Hamilton, Butler county, Ohio, (post-office address No. 1155 Ludlow street, Hamilton, Ohio,) have invented a certain new and useful Process of Treating Leaf-Tobacco, of which the following is a specification.

It frequently happens that leaf-tobacco becomes musty or mildewed or moldy before being subjected to the operation of cleaning, sweating, &c., and, again, it sometimes happens that tobacco received in good condition in the above respects develops mold, &c., during or after the sweating operation. In either case the tobacco becomes of inferior grade and will eventually rot. By my process I so treat the leaf as to remove all mold, &c., and leave the leaf in good condition of preservation and with its normal color, liveliness, and silkiness restored or enhanced. My process is applicable to the leaf regardless of the stage at which the mold, &c., may have developed—that is to say, regardless of whether the mold took place before or after the usual sweating operation—and my process is applicable to the leaf in any condition of moldiness short of rotting. My process will arrest the rotting, but will of course not remove from the leaf the defects due to such rotting as may have already taken place.

My process is to be executed as follows: I take the leaf, no matter how musty, &c., so long as it is not unduly rotted. I shake the leaf out and subject it to a dip in cold gasolene or similar light petroleum product. I then shake it and dry it by evaporation to any desired extent. The operations referred to may be conducted on each hand of leaf separately or on as many hands as can be conveniently handled in the operation. I then dip the leaf in an infusion of wild-cherry bark, hot or cold, the infusion to be of a strength to be determined by experience. I then drain and dry the leaf sufficiently for the usual treatment of good leaf. The result of the process is that the leaf is free from mold, &c., and is lively and silky and of natural good color. If in the later usual sweating operation mold should become developed, the defect may be cured by again subjecting the leaf to my process.

By my process tobacco-leaf which is moldy, harsh, brittle, and quite unfit for satisfactory marketing may be brought to the best condition of which the original good leaf was capable. Tobacco treated by my process is quite without any special residual odor or taste due to the process.

The dipping of the leaf into the gasolene and its subsequent partial drying removes all odor or other trace of gasolene, but leaves the leaf harsh and brittle. The after treatment in the infusion of wild-cherry bark leaves the leaf in lively silky condition and of natural color without any flavoring effects due to the infusion.

What I claim as my invention, and desire to secure by Letters Patent, is—

The process for treating leaf-tobacco, consisting in subjecting the leaf, first, to immersion in gasolene or similar light petroleum product, second, partially drying the leaf to remove the gasolene or other light petroleum product therefrom, third, subjecting the leaf to a wetting in an infusion of wild-cherry bark to remove the harshness, &c., resulting from said immersion, and, fourth, partially drying the leaf.

LAFAYETTE LOVE.

Witnesses:
J. W. SEE,
ALONZO URMSTON.